United States Patent
Ferrara et al.

(10) Patent No.: US 9,684,788 B2
(45) Date of Patent: Jun. 20, 2017

(54) SELF-REPAIR AND DISTRIBUTED-REPAIR OF APPLICATIONS

(71) Applicant: International Business Machines Corporation, Armonk, NY (US)

(72) Inventors: Pietro Ferrara, White Plains, NY (US); Marco Pistoia, Amawalk, NY (US); Omer Tripp, Bronx, NY (US); Petar I. Tsankov, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 169 days.

(21) Appl. No.: 14/753,569

(22) Filed: Jun. 29, 2015

(65) Prior Publication Data

US 2016/0378987 A1    Dec. 29, 2016

(51) Int. Cl.
  *G06F 21/56* (2013.01)
  *H04L 29/06* (2006.01)

(52) U.S. Cl.
  CPC ............ *G06F 21/566* (2013.01); *H04L 63/20* (2013.01)

(58) Field of Classification Search
  CPC combination set(s) only.
  See application file for complete search history.

(56) References Cited

U.S. PATENT DOCUMENTS

| | | | | |
|---|---|---|---|---|
| 8,117,640 B1 * | 2/2012 | Moriconi | ............ | H04L 63/102 726/1 |
| 9,009,822 B1 * | 4/2015 | Ismael | ............ | G06F 21/53 726/22 |
| 9,349,015 B1 * | 5/2016 | Archer | ............ | G06F 21/60 |
| 2002/0095524 A1 * | 7/2002 | Sanghvi | ............ | G06F 9/542 719/318 |
| 2005/0080914 A1 * | 4/2005 | Lerner | ............ | G06F 9/546 709/230 |
| 2006/0021054 A1 * | 1/2006 | Costa | ............ | G06F 21/566 726/25 |
| 2007/0107057 A1 * | 5/2007 | Chander | ............ | G06F 21/54 726/22 |

(Continued)

FOREIGN PATENT DOCUMENTS

| WO | WO2007092524 | * | 2/2007 |
|---|---|---|---|
| WO | WO2009094384 | * | 1/2009 |

OTHER PUBLICATIONS

Zhang et al., "Static program analysis assisted dynamic taint tracking for sfotware vulnerability discovery", Computers and Mathematics with Applications 63 (2012), p. 469-480, 0898-1221.*

(Continued)

*Primary Examiner* — Peter Poltorak
(74) *Attorney, Agent, or Firm* — Fusheng Xu

(57) ABSTRACT

A method is provided to instrument applications with an instrumentation policy that is visually configurable and allows for run-time modifications of the policy. Instrumentation is achieved without modifying the source code of the applications. Modification of the instrumentation policy of an application is applied without re-compiling, re-deploying, and re-provisioning the application. The instrumentation tracks the flow of values at run time throughout the execution of an application and fixes any security violation automatically by dynamically modifying any value that violates integrity or confidentiality.

20 Claims, 5 Drawing Sheets

(56) References Cited

U.S. PATENT DOCUMENTS

| | | | |
|---|---|---|---|
| 2007/0162541 A1* | 7/2007 | Dhawan | H04L 41/0806 709/203 |
| 2008/0201760 A1* | 8/2008 | Centonze | H04L 63/102 726/1 |
| 2010/0037294 A1* | 2/2010 | Kidd | H04N 21/2541 726/2 |
| 2010/0064341 A1* | 3/2010 | Aldera | H04L 63/102 726/1 |
| 2010/0293407 A1* | 11/2010 | Locasto | G06F 11/3672 714/2 |
| 2011/0113126 A1* | 5/2011 | Fang | H04L 41/0806 709/220 |
| 2011/0230211 A1* | 9/2011 | Kim | G06F 21/71 455/456.4 |
| 2011/0231936 A1* | 9/2011 | Williams | G06F 21/577 726/25 |
| 2013/0246996 A1 | 9/2013 | Duggal et al. | |
| 2013/0262617 A1 | 10/2013 | Ligman et al. | |
| 2013/0298185 A1* | 11/2013 | Koneru | G06F 15/173 726/1 |
| 2014/0032691 A1* | 1/2014 | Barton | H04L 41/00 709/206 |
| 2014/0101769 A1* | 4/2014 | Tripp | G06F 21/12 726/25 |
| 2015/0040233 A1* | 2/2015 | Oliphant | H04L 63/1441 726/25 |
| 2015/0096025 A1* | 4/2015 | Ismael | G06F 21/566 726/23 |

OTHER PUBLICATIONS

Livshits Ben, "Dynamic Tain Tracking in Managed Runtimes", MSR-TR-2012-114, 11/12.*

Disclosed Anonymously et al., "A Policy-controlled Adaptive Platform for Querying Real-time SmartPhone Data", An IP.com Prior Art Database Technical Disclosure, IP.com No. 000228639, IP.com Electronic Publication: Jun. 26, 2013, pp. 1-10.

Disclosed Anonymously et al., "MobiTrans—A Mobile Web Solution Framework", An IP.com Prior Art Database Technical Disclosure, IP.com No. 000219522, IP.com Electronic Publication: Jul. 5, 2012, pp. 1-17.

* cited by examiner

| Enterprise Mobile Application, 630 |
| Dynamic Information-flow Security Policy, 620 |
| Application-level instrumentation, 610 |
| Operating system (OS), 600 |

FIG. 6

SELF-REPAIR AND DISTRIBUTED-REPAIR OF APPLICATIONS

BACKGROUND

The present invention relates generally to the field of computer security, and more particularly to dynamic taint tracking and analysis.

Dynamic analysis refers to the ability to monitor codes as they execute, and is a fundamental tool in computer security field. Dynamic analysis can perform precise security analysis based upon run-time information by reasoning about actual executions of codes.

Dynamic taint analysis is a commonly employed dynamic analysis technique in the computer security field. The term "taint" as referred to herein is where malicious users have the ability to execute commands on a host computer or to influence the parameters to those commands. Dynamic taint analysis includes running a program and observing which, if any, computations are affected by predefined taint sources, such as user input. Dynamic taint analysis is also applied in unknown vulnerability detection where dynamic taint analysis looks for the misuse of user input during the execution of an application during run time. For example, dynamic taint analysis is used to prevent code injection attacks by monitoring whether user input is executed. Dynamic taint analysis also applies to malware analysis, where dynamic taint analysis is used to analyze how information flows through a malware binary, explore trigger-based behavior, and detect emulators.

SUMMARY

According to an aspect of the present invention, there is a method, computer program product and/or system for self-repair and distributed-repair of applications that performs the following operations (not necessarily in the following order): providing a visual editor for a first set of policy configurations; instrumenting the first set of policy configuration into a set of application instances corresponding to a set of computers; detecting an information-flow-security violation at run time of a first application instance in the set of application instances corresponding to a first computer of the set of computers; correcting the information-flow-security violation for the first application instance corresponding to the first computer, to establish a corrected information-flow-security violation; establishing a second set of policy configurations for the first application instance corresponding to the first computer based at least in part on the corrected information-flow-security violation; communicating the second set of policy configurations to a monitor agent on a second computer of the set of computers; and establishing by the monitor agent the second set of policy configuration for a subset of application instances in the set of application instances. wherein: at least the step of establishing a second set of policy configurations for the first application instance is performed by computer software running on computer hardware.

BRIEF DESCRIPTION OF THE DRAWINGS

FIG. 6 is a schematic of a logic diagram of an operating system (OS), instrumentation, and application according to an embodiment of the present invention.

DETAILED DESCRIPTION

Figure 1:
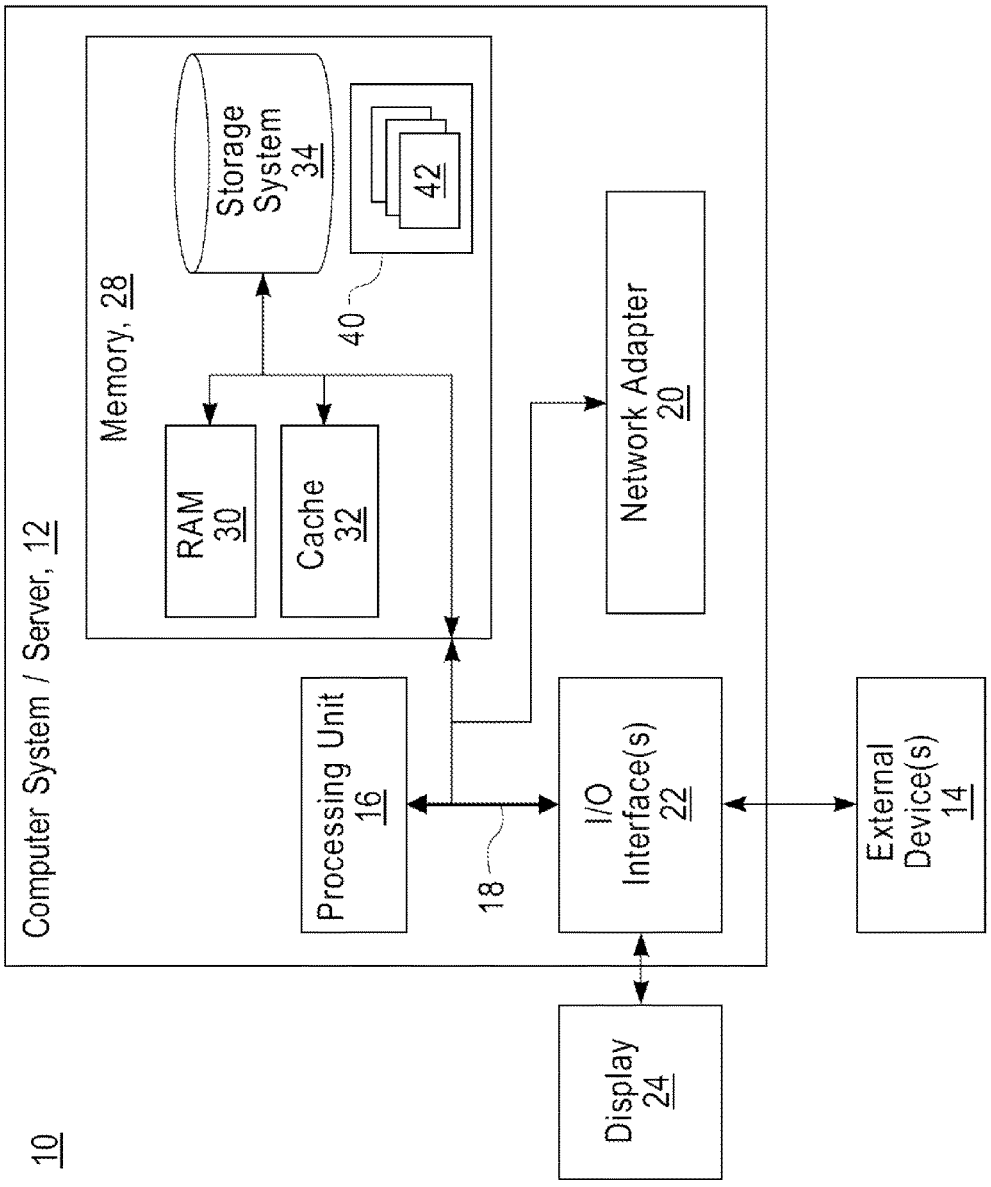
FIG. 1 depicts a cloud computing node used in a first embodiment of a system according to the present invention.

A method is provided to instrument applications with an instrumentation policy that is visually configurable and allows for run-time modifications of the policy. Instrumentation can be achieved without modifying the source code of the applications. Modification of the instrumentation policy of an application can be applied without re-compiling, re-deploying, and re-provisioning the application. The instrumentation tracks the flow of values at run time throughout the execution of an application and fixes any security violation automatically by dynamically modifying any value that violates integrity or confidentiality. This Detailed Description section is divided into the following sub-sections: (i) The Hardware and Software Environment; (ii) Example Embodiment; (iii) Further Comments and/or Embodiments; and (iv) Definitions.

I. THE HARDWARE AND SOFTWARE ENVIRONMENT

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
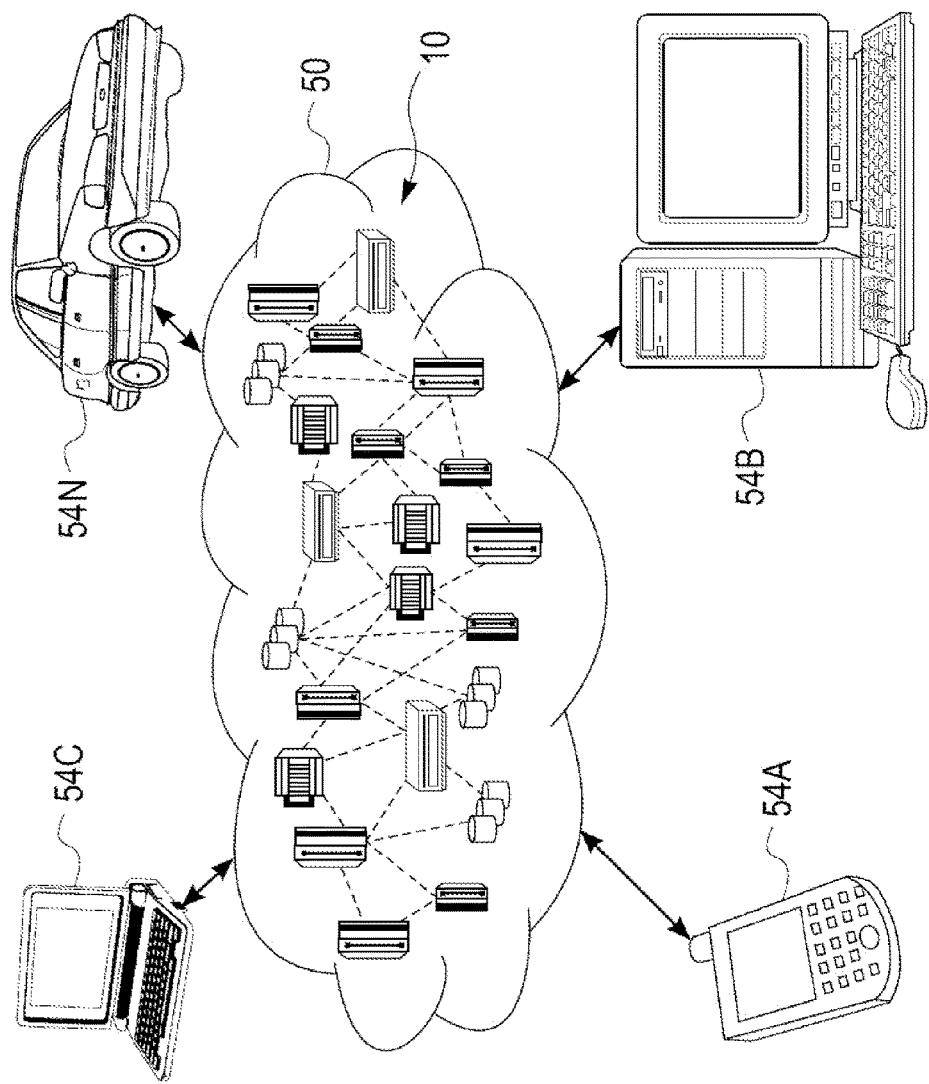
FIG. 2 depicts an embodiment of a cloud computing environment (also called the "first embodiment system") according to the present invention.

Referring now to FIG. 2, illustrative cloud computing environment 50 is depicted. As shown, cloud computing environment 50 comprises one or more cloud computing nodes 10 with which local computing devices used by cloud consumers, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
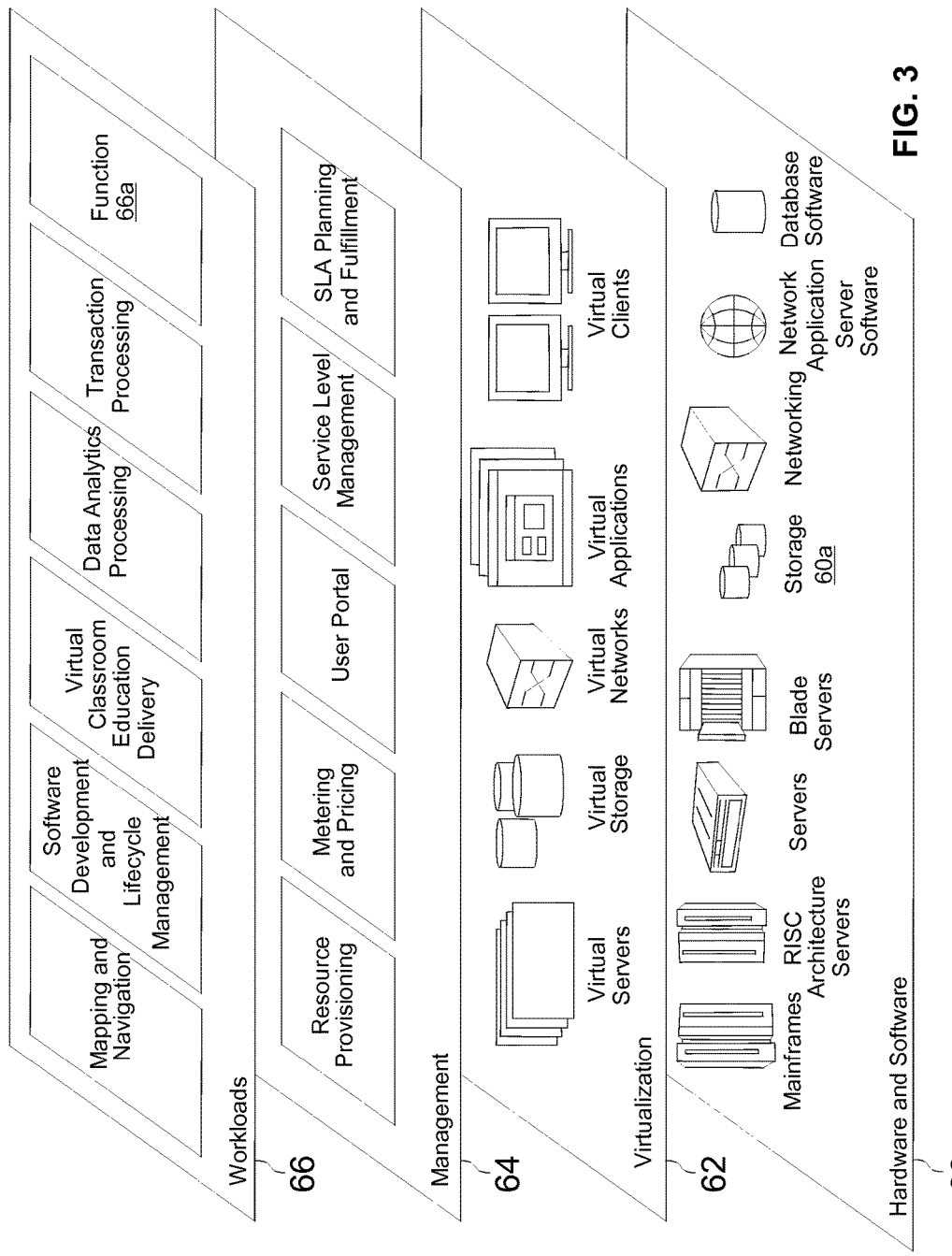
FIG. 3 depicts abstraction model layers used in the first embodiment system.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes; RISC (Reduced Instruction Set Computer) architecture based servers; storage devices; networks and networking components. In some embodiments software components include network application server software.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and functionality according to the present invention (see function block 66a) as will be discussed in detail, below, in the following sub-sections of this Detailed description section.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. EXAMPLE EMBODIMENT

Dynamic taint tracking consists of following the flow of untrusted or confidential data throughout the execution of an application at run time, in order to dynamically detect any flow from a source to a sink that is not intercepted by a sanitizer (e.g., in integrity) or by a declassifier (e.g., in confidentiality). In some embodiments of the present invention, a framework is provided that can be integrated into mobile applications, such as applications running on Android or iOS. The integration may be performed either at development time (e.g., through a software development kit (SDK)) or even after development through a novel dynamic instrumentation technique that can be applied to, for example, both Android and iOS compiled applications.

(Note: the term(s) "Android" and/or "iOS" may be subject to trademark rights in various jurisdictions throughout the world and are used here only in reference to the products or services properly denominated by the marks to the extent that such trademark rights may exist.)

In some embodiments of the present invention, the instrumentation tracks the flow of data throughout the application at run time. If a security violation occurs, the underlying instrumentation automatically repairs (herein the terms "correct", "repair" and "fix" are interchangeable) the application by sanitizing the data being used in a security-sensitive operation, and/or by obfuscating any confidential data that may be released to public observers. This automatic and dynamic fixing technique saves the application from having to be terminated. Any corrective fixing action is then propagated through a service to all the other application instances running on devices of other users. In this sense, the automatic fixing technique is both self-fixing (because it allows an application to fix itself) and distributed-fixing (because it allows several applications to communicate the necessary fixes with each other even before vulnerabilities occurs).

In some embodiments of the present invention, a method is provided that allows for instrumenting mobile applications, either programmatically (via an SDK at development time directly on the application's source code) or after development (via application wrapping directly on the application's compiled code). The instrumentation is dynamically configurable and automatically tracks the flow of information and data across the execution of the program. If the instrumentation detects that a violation is about to occur, it automatically fixes the violation by invoking the necessary sanitization routine (e.g., for an integrity violation) or the necessary declassification routine (e.g., for a confidentiality violation). In some embodiments, the instrumentation is dynamically configurable via a configuration database. Therefore, the configuration is completely declarative. This means that any change to the instrumentation policy (for example, if a new vulnerability is discovered) can be pushed to the individual devices and applications without having to redeploy or reprovision the application itself, and without even having to notify the user that the application's instrumentation is being updated. Once a violation has been fixed for a given application, the instrumentation of that application notifies a server, which, then, notifies other application instances on other devices, so that the devices can immediately implement the necessary fix.

Figure 4:
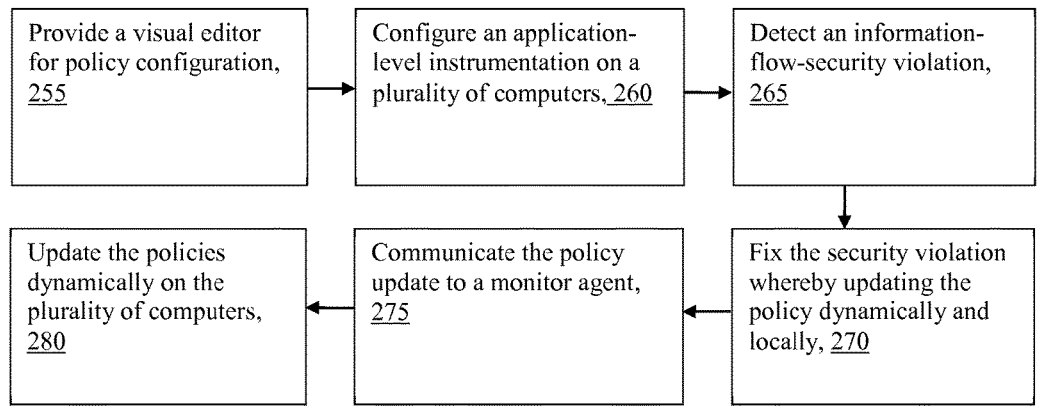
FIG. 4 is a flowchart showing a first embodiment method performed, at least in part, by the first embodiment system.
Figure 5:
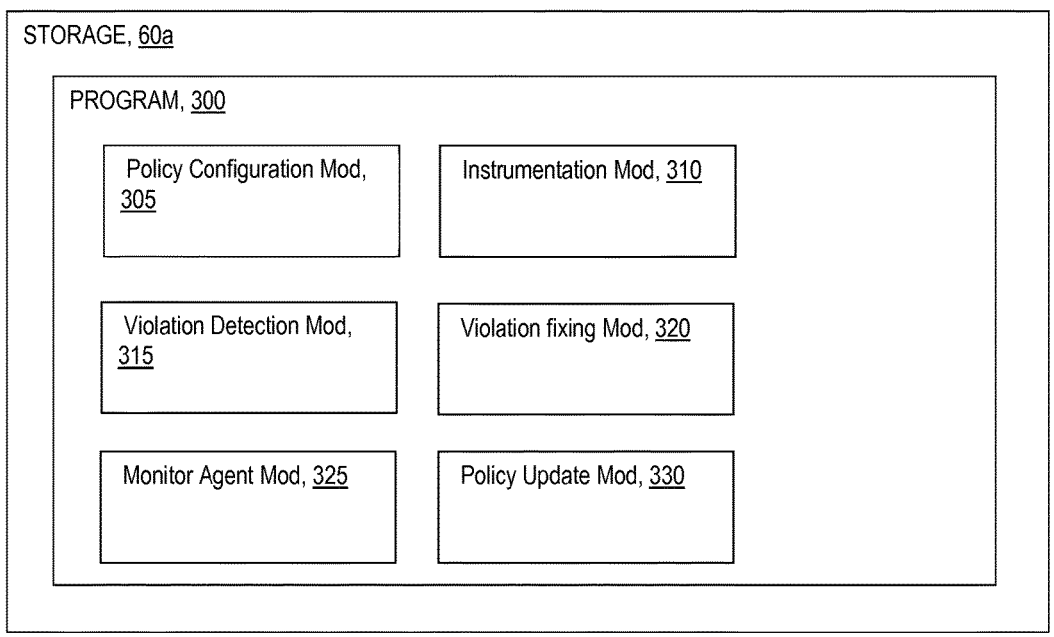
FIG. 5 is a block diagram showing a machine logic (for example, software) portion of the first embodiment system.

FIG. 4 shows flowchart 250 depicting a method according to the present invention. FIG. 5 shows program 300 for performing at least some of the method operations of flowchart 250. FIG. 6 describes a schematic of logic diagram of application, instrumentation, and operating system used by the method operation of flowchart 250. This method and associated software will now be discussed, over the course of the following paragraphs, with extensive reference to FIG. 4 (for the method operation blocks), FIG. 5 (for the software blocks), and FIG. 6. One physical location where program 300 of FIG. 5 may be stored is in storage block 60a (see FIG. 3).

Processing begins at operation S255, where policy configuration module ("mod") 305 provides a tool for visual configuration of information-flow security policies. In this example, the tool is a visual editor for policy configuration. The configuration may be based on either static or dynamic extraction of an application views, or a combination thereof. Thus, an instrumentation itself, to be discussed in more detail below, is decoupled from its own configuration. The visual editor may be running on cloud node 10, as shown in FIG. 1, including any personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and/or distributed cloud computing environments that include any of these systems or devices. The configured security policy is provided as an input to an application instrumentation that is discussed in more detail below, with reference to a server-provided security policy that is enforced at run time.

Processing proceeds to operation S260, where instrumentation mod 310 configures an application-level instrumentation on a plurality of computers. In this example, the plurality of computers may each be a cloud node, such as cloud node 10 (FIG. 1), including any personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and/or distributed cloud computing environments that include any of these systems or devices.

The application-level instrumentation configured by the policy, for example, application-level instrumentation 610 shown in FIG. 6, is injected into an application running on the plurality of computers in order to detect any flow from a source to a sink that is not intercepted by a downgrader. In this example, the instrumentation is a library that is injected into either the source code or compiled code of the application, and that intercepts any communication between the application (e.g., enterprise mobile application 630 in FIG. 6) and the operation system (e.g., operating system 600 in FIG. 6). The instrumentation is injected either at development time into the source code via an SDK or after the code has been both developed and compiled into the binary via an application wrapping process. This allows for instrumenting applications for which the source code is no longer available. Thus, a policy is deployed to individual application instances and can be modified at run time without having to redeploy or reprovision the application and, further, without having to seek the consent of a user.

Processing proceeds to operation S265, where violation detection mod 315 detects an information-flow-security violation of the application running on a cloud node 10. Once the application is instrumented, the application-level instrumentation dynamically tracks flows of data throughout the execution of the application, looking for forbidden flows, which correspond to flows of untrusted data into security-sensitive computations (e.g., integrity vulnerabilities) or flows that release private data to unauthorized parties (e.g., confidentiality vulnerabilities). The application-level instrumentation may detect an information-flow-security violation on a first computer of the plurality of computers, consisting of an explicit flow of data from a source to a sink that is not intercepted by a sanitizer (if it is an integrity violation) or a declassifier (if it is a confidentiality violation). Since this analysis is dynamic, it has no false positives, and detects any violation occurring at run time.

Processing proceeds to operation S270, where violation fixing mod 320 fixes a security violation by updating the security policy dynamically and locally. In this example, upon detecting a security violation of the application running on the first computer, the application-level instrumentation on the first computer automatically fixes the problematic flows without causing the application to abort, such as terminating the application, and without causing side effects, such as modifying values in such ways that would break the functionality of the application in other program points where those same values are used. Thus, the application is corrected automatically in order to enforce integrity and confidentiality without aborting the application and without causing side effects. For example, tracking the flow of values throughout the execution of an application, and dynamically modifying any value that could break integrity or confidentiality, in such a way that the application can continue to execute without having to be aborted and without executing unintended operations based on the values modified by violation fixing mod 320.

Further, the application-level instrumentation updates the local policy (e.g., dynamic information-flow security policy 620 in FIG. 6) deployed on the first computer, so that, from now on, any call to that particular sink will be preceded by a call to the appropriate declassifier and/or sanitizer. By doing this, the application on the first computer fixes itself. Thus, policy is dynamically updated locally on the first computer and, accordingly, the application heals itself. Thus, when a new policy needs to be enforced or an existing instrumented policy needs to be modified, such changes can be applied at run time without having to recompile, redeploy, and reprovision the application. That is, the security policy is transparently updated on the first computer with the fix of the newly discovered vulnerability.

Processing proceeds to operation S275, where monitor agent mod 325 communicates the policy update to a monitor agent. In this example, the application-level instrumentation on the first computer communicates the new policy update from the first computer, on which the policy is updated to correct the security violation, to a monitor agent. The monitor agent performs as if it were a server running on a cloud node in the cloud computing environment, such as cloud node 10 shown in FIG. 2.

Processing ends at operation S280, where policy update mod 330 updates the policies dynamically deployed on other computers of the plurality of computers. In this example, the monitoring agent notifies the other application instances running respectively on other computers of the plurality of computers (e.g., remote devices owned by other users) and causes their policies to be updated accordingly. This phase is referred to as "vaccination," that is, the other application instances are "vaccinated" because the updated policy prevents the other application instances from getting the "disease" to which the original application instance on the first computer had been exposed. Further, it is possible to refine the fix and the policy based on other notifications coming from other application instances except the application instance on the first computer.

III. FURTHER COMMENTS AND/OR EMBODIMENTS

Once an application has been instrumented, it is possible for an enterprise/organization to decide on a different security policy for the application. In general, this would require: (i) re-instrumenting the application with a different instrumentation that behaves according to the new requirements; (ii) redeploying the application; and/or (iii) redistributing the newly instrumented application to all the users, hoping that they will accept an update. Some embodiments of the present invention bypass all these restrictions because they are based on two forms of decoupling: (i) the application is decoupled from its instrumentation; and (ii) the instrumentation itself is decoupled from its own configuration. Thus, any new policy change can be accomplished by simply pushing a new configuration to the instrumentation of the application running on a computer/device. This can be accomplished using, for example, the push notification protocol.

Some embodiments of the present invention recognize the following facts, potential problems and/or potential areas for improvement with respect to the current state of the art: (i) some conventional dynamic taint analysis mechanisms require source code; (ii) some conventional dynamic taint analysis mechanisms require special recompilation of the program; (iii) some conventional dynamic taint analysis mechanisms require recompiling the libraries; (iv) some conventional dynamic taint analysis mechanisms require modifying the original source codes; (v) some conventional dynamic taint analysis mechanisms are not compatible with some programs; (vi) upon detection of security vulnerabilities, some conventional dynamic taint analysis mechanisms abort the application; (vii) upon detection of security vulnerabilities, some conventional dynamic taint analysis mechanism require the user's consent to fix the vulnerabilities; (viii) upon updating security policy, some conventional dynamic taint analysis mechanisms have to update the application; (ix) upon updating security policy, some conventional dynamic taint analysis mechanisms have to recompile the application; (x) upon updating security policy, some conventional dynamic taint analysis mechanisms have to redeploy the application; (xi) upon updating security policy, some conventional dynamic taint analysis mechanisms have to reprovision the application; (xii) some conventional dynamic taint analysis mechanisms require to change some of the existing programs running on the computer; and/or (xiii) some conventional dynamic taint analysis mechanisms require to perform some configurations of the operating system.

Some embodiments of the present invention may include one, or more, of the following features, characteristics and/or advantages: (i) perform automatic program instrumentation with data-flow-tracking capabilities without having to modify the source code; (ii) perform automatic remediation of information to flow security vulnerabilities without having to abort the application or ask the user to consent; (iii) perform transparent update of the information to flow security policy without having to update, recompile, redeploy or reprovision the application, and without having to ask the end user to consent; (iv) perform collaborative application security healing, whereby an application fixes itself and communicates the fix to any other application instance potentially running on other users' devices; (v) do not require modifying any of the existing programs running on the computer, not even the operating system itself; (vi) work by instrumenting individual applications; and/or (vii) instrument even applications for which the source code no longer exists, which means that the binary of the application can be instrumented to make the present invention effective under any circumstance.

IV. DEFINITIONS

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

User: includes, but is not necessarily limited to, the following: (i) a single individual human; (ii) an artificial intelligence entity with sufficient intelligence to act as a user or subscriber; and/or (iii) a group of related users or subscribers.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A method for self-repair and distributed-repair of applications, the method comprising:
providing a visual editor for a first set of policy configurations;
instrumenting the first set of policy configuration into a set of application instances corresponding to a set of computers;
detecting an information-flow-security violation at run time of a first application instance in the set of application instances corresponding to a first computer of the set of computers;
correcting the information-flow-security violation for the first application instance corresponding to the first computer, to establish a corrected information-flow-security violation;
establishing a second set of policy configurations for the first application instance corresponding to the first computer based at least in part on the corrected information-flow-security violation;
communicating the second set of policy configurations to a monitor agent on a second computer of the set of computers; and
establishing by the monitor agent the second set of policy configuration for a subset of application instances in the set of application instances,
wherein:
at least the step of establishing a second set of policy configurations for the first application instance is performed by computer software running on computer hardware.

2. The method of claim 1, further comprising:
refining the corrected information-flow-security violation and the second set of policy configurations for the first application instance based on a notification from a second application instance in the set of application instances corresponding to a third computer of the set of computers.

3. The method of claim 1, wherein the step of instrumenting the first set of policy configurations into a set of application instances includes:
injecting the first set of policy configurations into a source code of the set of application instances.

4. The method of claim 1, wherein:
the first set of policy configurations is dynamically modified at run time;
the first application instance corresponding to the first computer is not redeployed or reprovisioned; and
a consent of a user is not requested.

5. The method of claim 1, wherein the step of detecting an information-flow-security violation at run time of a first application instance in the set of application instances corresponding to a first computer of the set of computers includes:
dynamically tracking a flow of data throughout an execution of the first application instance corresponding to the first computer; and
determining whether there exists a flow of untrusted data into a security-sensitive computation.

6. The method of claim 1, wherein the step of correcting the information-flow-security violation for the first application instance corresponding to the first computer includes:
dynamically modifying a value that breaks an integrity or a confidentiality while the first computer continues to execute the first application instance.

7. The method of claim 1, wherein the step of establishing the second set of policy configurations for a subset of application instances in the set of application instances includes:
notifying the application instances of a subset of application instances.

8. The method of claim 1, wherein the step of instrumenting the first set of policy configurations into a set of application instances includes:
injecting the first set of policy configurations into a compiled code of the set of application instances.

9. The method of claim 1, wherein the step of detecting an information-flow-security violation at run time of a first application instance corresponding to a first computer of the set of computers includes:
dynamically tracking a flow of data throughout an execution of the first application instance corresponding to the first computer; and
determining whether there exists a flow of data that releases private data to unauthorized parties.

10. A computer program product for self-repair and distributed-repair of applications, the computer program product comprising a computer readable storage medium having stored thereon:
first program instructions programmed to provide a visual editor for a first set of policy configurations;
second program instructions programmed to instrument the first set of policy configuration into a set of application instances corresponding to a set of computers;
third program instructions programmed to detect an information-flow-security violation at run time of a first application instance in the set of application instances corresponding to a first computer of the set of computers;
fourth program instructions programmed to correct the information-flow-security violation for the first application instance corresponding to the first computer, to establish a corrected information-flow-security violation;
fifth program instructions to establish a second set of policy configurations for the first application instance corresponding to the first computer based at least in part on the corrected information-flow-security violation;
sixth program instructions to communicate the second set of policy configurations to a monitor agent on a second computer of the set of computers; and seventh program instructions to establish by the monitor agent the second set of policy configuration for a subset of application instances in the set of application instances.

wherein:

at least the step of establishing a second set of policy configurations for the first application instance is performed by computer software running on computer hardware.

11. The computer program product of claim 10, further comprising:

eighth program instructions to refine the corrected information-flow-security violation and the second set of policy configurations for the first application instance based on a notification from a second application instance in the set of application instances corresponding to a third computer of the set of computers.

12. The computer program product of claim 10, wherein the step of instrumenting the first set of policy configurations into a set of application instances includes:

injecting the first set of policy configurations into a source code of the set of application instances.

13. The computer program product of claim 10, wherein:

the first set of policy configurations is dynamically modified at run time;

the first application instance corresponding to the first computer is not redeployed or reprovisioned; and a consent of a user is not requested.

14. The computer program product of claim 10, wherein the step of detecting an information-flow-security violation at run time of a first application instance in the set of application instances corresponding to a first computer of the set of computers includes:

dynamically tracking a flow of data throughout an execution of the first application instance corresponding to the first computer; and determining whether there exists a flow of untrusted data into a security-sensitive computation.

15. A computer system for self-repair and distributed-repair of applications, the computer system comprising:

a processor(s) set; and a computer readable storage medium;

wherein:

the processor set is structured, located, connected and/or programmed to run program instructions stored on the computer readable storage medium; and the program instructions include:

first program instructions programmed to provide a visual editor for a first set of policy configurations;

second program instructions programmed to instrument the first set of policy configuration into a set of application instances corresponding to a set of computers;

third program instructions programmed to detect an information-flow-security violation at run time of a first application instance in the set of application instances corresponding to a first computer of the set of computers;

fourth program instructions programmed to correct the information-flow-security violation for the first application instance corresponding to the first computer, to establish a corrected information-flow-security violation;

fifth program instructions to establish a second set of policy configurations for the first application instance corresponding to the first computer based at least in part on the corrected information-flow-security violation;

sixth program instructions to communicate the second set of policy configurations to a monitor agent on a second computer of the set of computers; and seventh program instructions to establish by the monitor agent the second set of policy configuration for a subset of application instances in the set of application instances.

wherein:

at least the step of establishing a second set of policy configurations for the first application instance is performed by computer software running on computer hardware.

16. The computer system of claim 15, wherein:

the first set of policy configurations is dynamically modified at run time;

the first application instance corresponding to the first computer is not redeployed or reprovisioned; and a consent of a user is not requested.

17. The computer system of claim 15, wherein the step of detecting an information-flow-security violation at run time of a first application instance in the set of application instances corresponding to a first computer of the set of computers includes:

dynamically tracking a flow of data throughout an execution of the first application instance corresponding to the first computer; and determining whether there exists a flow of untrusted data into a security-sensitive computation.

18. The computer system of claim 15, wherein the step of correcting the information-flow-security violation for the first application instance corresponding to the first computer includes:

dynamically modifying a value that breaks an integrity or a confidentiality while the first computer continues to execute the first application instance.

19. The computer system of claim 15, wherein the step of establishing the second set of policy configurations for a subset of application instances in the set of application instances includes:

notifying the application instances of a subset of application instances.

20. The computer system of claim 15, wherein the step of instrumenting the first set of policy configurations into a set of application instances includes:

injecting the first set of policy configurations into a compiled code of the set of application instances.

* * * * *